United States Patent [19]

Wright et al.

[11] 4,355,437
[45] Oct. 26, 1982

[54] QUICK CHANGE DRIVE FOR SHIRRING MACHINE CONTROL SHAFT

[75] Inventors: Norbert L. Wright, Park Ridge; Wayne L. Hahn, Chicago, both of Ill.

[73] Assignee: Teepak, Inc., Chicago, Ill.

[21] Appl. No.: 147,771

[22] Filed: May 8, 1980

[51] Int. Cl.³ ............................................ A22C 13/02
[52] U.S. Cl. .......................................... 17/42; 17/1 R
[58] Field of Search ...................... 17/41, 42, 49, 1 R, 17/33, 34, 35; 82/29 R

[56] References Cited

U.S. PATENT DOCUMENTS

| 1,417,521 | 5/1922 | Haumann | 82/29 X |
| 3,112,516 | 12/1963 | Bonnee | 17/42 |
| 4,153,975 | 5/1979 | Ziolko | 17/1 F X |

Primary Examiner—Willie G. Abercrombie
Attorney, Agent, or Firm—Charles E. Brown

[57] ABSTRACT

This relates to a continuous shirring machine wherein there is a control shaft which controls the timed operation of various components of the machine. The control shaft is driven by a primary drive unit of the machine through a quick change gear unit and an adjustable drive connection so as to vary the functions of the machine primarily for the purpose of varying the lengths of strands of shirred casing produced by the machine.

2 Claims, 5 Drawing Figures

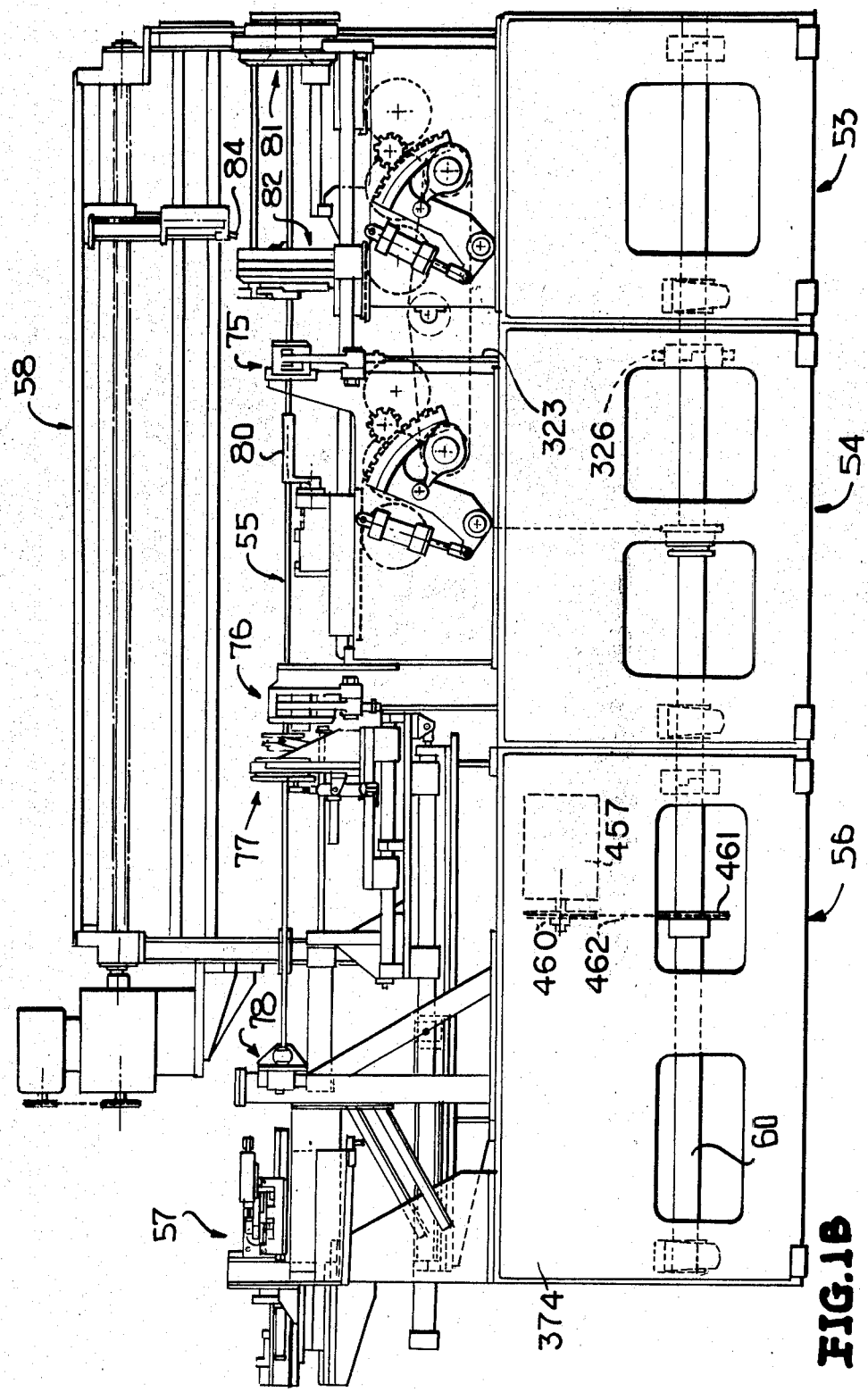

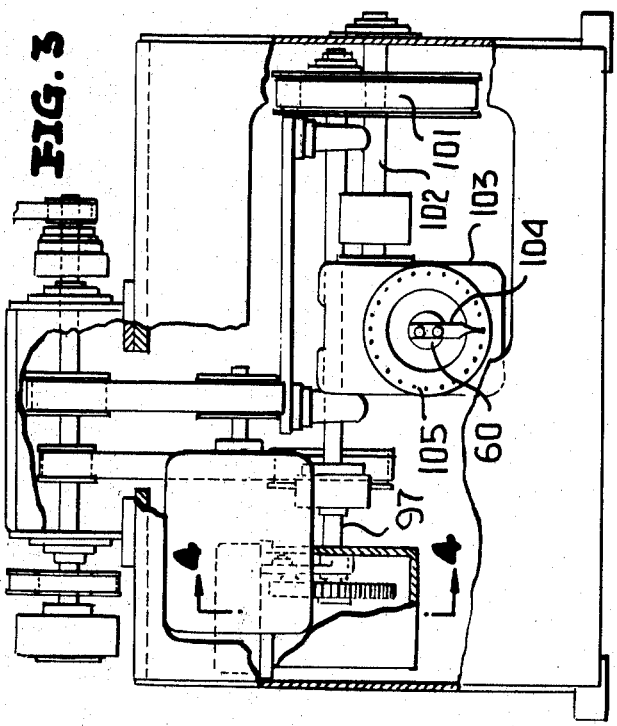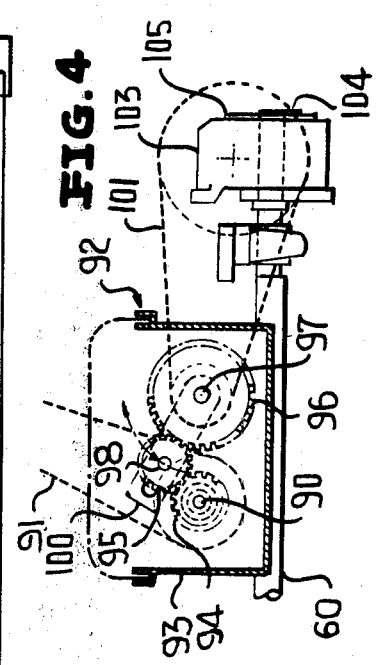

QUICK CHANGE DRIVE FOR SHIRRING MACHINE CONTROL SHAFT

This invention relates to improvements in machines for shirring tubular casings, such as sausage casings. The machine specifically is one which continuously shirrs casings and separates the casings into individual strands of predetermined lengths and densities and then performs further operations on the strands including compressing and doffing.

The machine in accordance with this invention is provided with a primary control shaft which extends the length of the machine and which drives various mechanisms of the machine either by power takeoffs, cams or electrical control switches.

This invention has to do with a quick change gear unit and adjustable drive connection between a primary drive unit of the shirring machine and a main or control shaft of the machine.

In order that the lengths of separated shirred casings strands may be varied to meet the requirements of individual customers, it is necesary that the drive between the primary drive unit of the machine and the control shaft be adjustable, thereby varying the timing of the operation of the machine with respect to the shirred casing. In accordance with this invention there is provided a quick change gear unit which permits the necessary drive adjustment with a minimum of effort and down time.

In accordance with the invention, there are also provided means for determining the angular position of the control shaft for facilitating the proper indexing of the control shaft with respect to the primary drive unit.

With the above and other objects in view that will hereinafter appear, the nature of the invention will be more clearly understood by reference to the following detailed description, the appended claims, and the several views illustrated in the accompanying drawings.

IN THE DRAWINGS:

FIGS. 1A and 1B are side elevational views of the continuous casing shirring machine showing the general details thereof.

FIG. 3 is an enlarged fragmentary end view, with parts broken away and shown in section, of the forward end of the machine and shows various details of the timing mechanism.

FIG. 4 is a schematic view showing details of a quick change drive assembly.

Figure 1A:
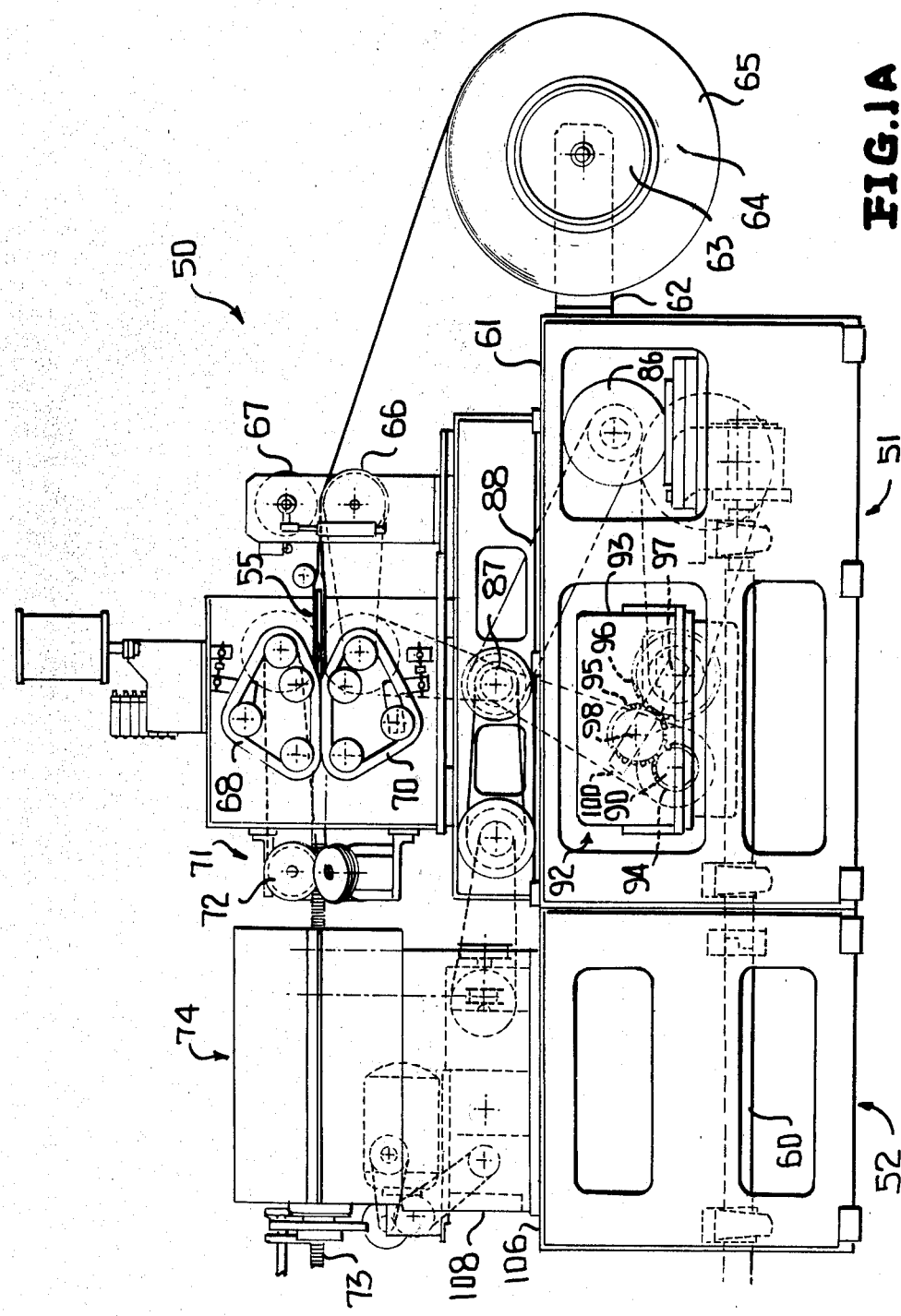

Referring now to the drawings in detail, reference is first made to FIGS. 1A and 1B wherein the general details of the continuous casing shirring and spinning machine are illustrated, the machine being generally identified by the numeral 50. The machine is formed of a plurality of replaceable units which include a casing feed and shirring unit 51 located at the head of the machine. Next, there is a combined shirred casing hold back and density control unit 52. This is followed by a casing separator unit 53 which receives the density controlled shirred casing and separates it into individual strands of regulated lengths. When desired, there is next an auxiliary hold back unit 54 which also carries clamp type supports for the mandrel in a manner to be described in detail hereinafter, the mandrel being generally identified by the numeral 55.

The next unit is a casing compresser and doffer unit generally identified by the numeral 56. This unit has associated therewith a combined strand handler and end closer unit 57.

Bridging generally between the units 53 and 56 is a transport device 58 for transporting a separated shirred casing strand from the casing separator device 53 into the combined casing compresser and doffer device 56.

All of the units are driven in timed relation under the control of a main drive shaft 60 which extends the length of the machine.

Referring specifically to FIG. 1A, it is to be understood that basically the unit 51 is conventional and forms no part of this invention. The unit 51 includes a mounting base 61 which has extending forwardly from the front end thereof a support 62 for a reel holder 63 which, in turn, is adapted to have received thereon a reel 64 of flat casing. The casing, 65, is in the form of a tubular film of collagen or cellulose which are extensively used as a sausage casing. The film is initially formed as a continuous tube and is rolled flat. The flat film is fed through a nip defined by a metering roll 66 and a back-up roll 67 onto the forward end of the mandrel 55 wherein it is automatically opened and is internally pressurized by a combined air spray and lubricant or softening fluid spray.

The opened casing 65 is then fed along the mandrel 55 at a controlled rate by a pair of opposed drive belts 68, 70 in conventional manner. The casing 65 next passes through a shirring head 71 which includes a plurality of conventional shirring wheels 72 which radially inwardly fold or shirr the casing so that many feet of the casing may be compressed into a relatively short space. For example, eighty feet of the casing may eventually be compressed into a stick or strand having a length on the order of thirteen inches.

The shirred casing, identified by the numeral 73, then passes into a combined casing hold back and density control device 74 which is part of the density control unit 52. The device 74 receives the shirred casing and permits the shirred casing to be advanced at the same rate as it is shirred by the shirring head 71. The device 74 is also mounted for rotation about the axis of the mandrel so as to impart a spin to the shirred casing 73 as desired. The density control device 74 may be selectively rotated in opposite directions either continuously or alternately so as either continuously to spin the casing in a selected direction or first to spin the casing in one direction and then in the opposite direction so as effectively to cancel the spin in the overall length of the casing.

The density controlled shirred casing is directed to the unit 53 which at timed intervals is operated to grip an intermediate portion of the shirred casing with one set of fingers holding back the casing and the other advancing the casing to tear off or segregate a leading portion of the casing into individual sticks or strands of controlled length.

At this time it is pointed out that while the mandrel 55 is generally supported at spaced intervals along its length by various components of the machine 50, there are two sets of mandrel support clamp assemblies 75 and 76. The mandrel support clamp assemblies 75 and 76 serve to introduce into the mandrel 55 in a known manner separate streams of air and lubricating or casing softening liquids. One of the support clamp assemblies 75 and 76 remain closed at all times and is separately openable to permit a separated casing strand to be advanced along the mandrel 55 to the device 56 for first compressing the strand and then doffing the strand from the tail end of the mandrel. The support clamp assemblies 75 and 76 are actuated by linkage from the shaft 60 which, as shown in FIG. 1B, carries a cam 326 for positioning link 323 of the support clamp assembly 75, for example.

The auxiliary hold back device 54, when utilized, engages the advancing end of the shirred casing 73 and cooperates with the combined casing hold back and separator device 53 to maintain the density of the shirred casing.

When a casing strand is separated, it is engaged by the transporter 58 and transported first to an intermediate position between the mandrel support clamps 75, 76 and then through the mandrel support clamp 76 and a head of the shirred casing compresser an doffer unit 56 for an operation thereon by the device 56.

The combined casing compresser and doffer unit 56 includes a travelling head 77 which, in association with an openable stop assembly 78 first functions to compress a casing strand and then to doff the casing strand from the mandrel 55 and deliver it to the strand holder and closer unit 57.

Figure 2:
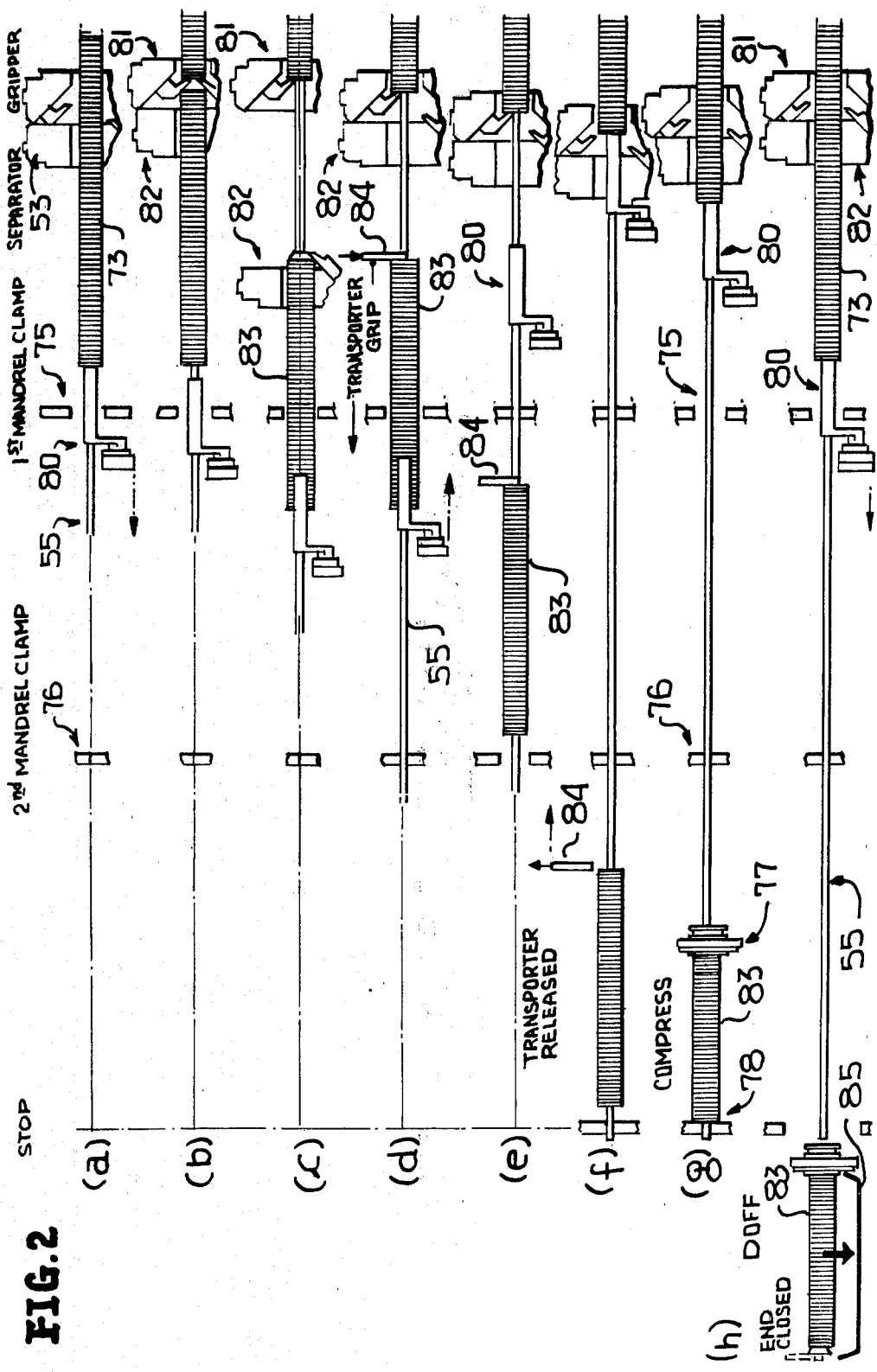
FIG. 2 is a schematic view showing the sequence of operation of the machine.

Reference is now made to the schematic showing of FIG. 2. It will be seen that with the mandrel support clamp 75 open and the mandrel support clamp 76 closed, the shirred casing 73 is advanced through the combined casing hold back and separator device 53 and a preselected length of the shirred casing has passed through the device 53. At this time, when the auxiliary hold back device 54 is used, a hold back head 80 of the auxiliary hold back device 54 will generally surround the mandrel 55 and permit the leading end of the shirred strand 73 to be advanced at the same rate as it is permitted to be advanced by the density control device 52.

At a controlled time, the head 80 will open and also begin rapidly to retract. At the same time the shirred casing will be gripped and held back by a hold back unit 81 of the device 53 while in the same plane as the unit 81 the shirred casing is also engaged by a separator unit 82 of the device 53. For a short period of time the units 81, 82 will be moved in unison, after which the unit 82 will be rapidly advanced as shown in FIG. 2c to pull apart an intermediate portion of the shirred casing 73 and to be able to separate from the continuously shirred casing a strand or stick 83. The separator unit then returns to its position adajcent the hold back unit 81, leaving the separated strand 83 advanced on the mandrel 55. The mandrel 55 is then loosely engaged by a pusher element 84 of the transporter 58 and the separated strand 83 moved to a position intermediate the mandrel support clamps 75, 76 as shown in FIG. 3e. At this time the support clamp assembly 75 closes, followed by the opening of the support clamp assembly 76 so that the casing strand 83 may again be transported along the mandrel 55.

Following the separation of the strand 83, it will be seen that the hold back unit 81 continues to engage the leading end of the shirred casing and cooperates with the density control device 74 to maintain the controlled density of the shirred casing.

The auxiliary hold back device, when utilized, next advances the head 80 thereof to engage the leading end of the shirred casing and the hold back unit 81 releases the leading end of the shirred casing so that the shirred casing may now pass through both the hold back unit 81 and the separator unit 82 under the control of the auxiliary hold back unit 54.

In the meantime, the casing strand 83 is being operated on by the combined casing compresser and doffer unit 56. The top 78 is closed and the head 77 engages the trailing end of the separated casing strand 83 and serves to compress the strand to the desired length. For example, the strand of controlled density may have had a length on the order of twenty-five inches when initially separated from the following shirred strand portion and is compressed to a length on the order of nineteen inches.

If desired, while the strand is being compressed, the head 77 may be oscillated or rotated about the mandrel 55 to shape the trailing end of the strand 83 to repair any minor deformation which may have occurred during the separation of the strand.

The stop 78 is then opened and the head 77 is further moved along the mandrel to doff the compressed strand 83 from the mandrel 55. The doffed strand is then received by a strand handler and closer 57 which laterally shifts the compressed strand into alignment with an end closer which is conventional, and thereafter deposit the closed strand in a receiving tray 85.

It is to be understood that the machine 50 is adjustable to receive tubular films of different diameters and different materials. Further, it is to be understood that the machine 50 is intended to supply strands of different lengths containing different footage of casing. Accordingly, it is necessary that the drive for the machine be adjustable. With reference to FIG. 1A, it will be seen that the machine 50 includes a primary drive motor 86 which drives a shaft 87 by means of a drive chain or belt 88. There is driven from the shaft 87, among other components, the shaft 60. In order to accomplish this, there is a shaft 90 which is driven from the shaft 87 by means of a drive belt or chain 91 and the shaft 90 constitutes the input for a quick change gear unit generally identified by the numeral 92. The quick change gear unit 92 includes a readily openable housing 93 into which the shaft 90 extends. The shaft carries a gear 94 with which there is meshed an intermediate gear 95 which, in turn, is meshed with a gear 96 carried by an output shaft 97. The intermediate gear 95 is carried by a shaft 98 which, in turn, is adjustable on a support 100 pivoted about the axis of the shaft 97.

The gear 94 is replaceable to change the drive ratio between the shaft 90 and the shaft 97 and the shaft 98 is shifted in accordance with the selected gear diameter so that the gear 95 will mesh with the new gear 94.

The shaft 97 extends transversely of the machine 50, as is best shown in FIG. 3, and is provided adjacent its opposite end with a drive belt connection 101 to a shaft 102 which is coupled to a reduction gear drive unit 103. The reduction gear drive unit 103 is coupled to the forward end of the control shaft 60 for efecting the rotation thereof at a greatly reduced speed. It is to be understood that the control shaft 60 is preferably rotated one revolution for each operating cycle of the machine 50. That is, for each revolution of the shaft 60 there will be formed one shirred casing strand 83.

It is to be understood that knowledge of the exact angular displacement of the shaft 60 is critical, and accordingly there is suitably secured to the forward end of the shaft 60 or an extension thereof in the drive unit 103 a fixed degree wheel 105. In this manner, the angular displacement of the shaft 60 may be accurately related to the drive therefor.

With reference to FIG. 4, it will be seen that the quick change drive 92 and its coupling to the shaft 60 is schematically illustrated, and the above described parts may be best understood by reference thereto.

Referring once again to FIGS. 1A and 3, it will be seen that the drive feed measuring roll 66, the feed belts 68, 70 and the shirring head 71 is taken from the shaft 87 in a conventional manner and that the rotational speed of the shaft 60 is varied by way of the quick change gear box 92 without changing the efficient operation of the casing feed and the shirring head.

In FIG. 1B the shaft 60 is shown as driving a conventional cam actuated switch unit 457 which is mounted on a base 374 of the unit 56. The switch unit actuates the various drives of the machine in timed relation and has a driven sprocket 460 driven by a drive sprocket 461 on the shaft 60 through a drive chain 462.

Although only a preferred embodiment of the invention has been specifically illustrated and described herein, it is to be understood that minor variations may be made in the quick change and timing units without departing from the spirit and scope of the invention as defined by the appended claims.

What is claimed as new is:

1. A shirring machine for continuously shirring a tubular casing and separating the continuously shirred casing into separate strands, said shirring machine comprising a control motor, drive means for continuously feeding casing and continuously shirring casing coupled to said control motor, a control shaft for controlling subsequent operations of said machine including casing separation, a quick change drive between said control motor and said control shaft for varying the rotational speed of said control shaft relative to the speed of continuous casing feed and shirring to change cycle time whereby the length of a separted shirred casing strand from a continuous shirred casing and subsequent operations may be varied, said quick change drive being of the type wherein there may be change in the rotational relationship between said drive means and said control shaft during a drive change, and timing means mounted on one end of said control shaft adjacent said quick change drive for assuring the proper rotational position of said control shaft relative to said drive means after a drive change.

2. A shirring machine according to claim 1 wherein said quick change drive includes an input shaft coupled to said control motor, an output shaft coupled to said control shaft, a drive gear carried by said input shaft, a driven gear carried by said output shaft, and an intermediate gear meshed with said drive gear and said driven gear, at least one gear selected from said drive gear and said driven gear being replaceable and the position of said intermediate gear being adjustable to compensate for the diameter differences between the original and the exchanged gear.

* * * * *